March 4, 1930.  A. GENTILINI  1,749,026
CINEMATOGRAPHIC MACHINE
Filed Aug. 28, 1926
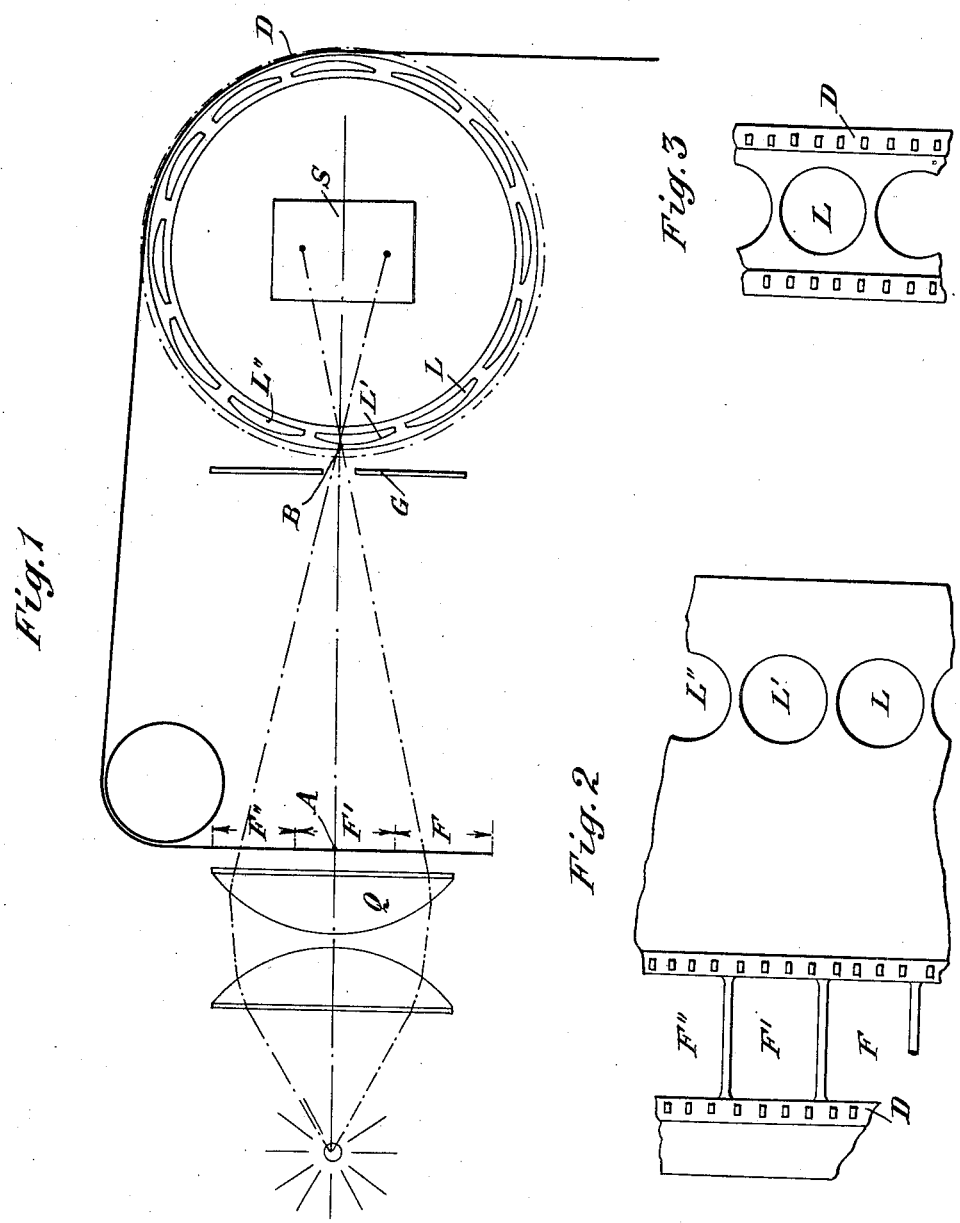
A. Gentilini
Inventor
By: Marks & Clark
Attys.

Patented Mar. 4, 1930

1,749,026

UNITED STATES PATENT OFFICE

AUGUSTO GENTILINI, OF ROME, ITALY, ASSIGNOR TO SOCIETÀ ANONIMA RADIO, OF ROME, ITALY

CINEMATOGRAPHIC MACHINE

Application filed August 28, 1926, Serial No. 132,299, and in Italy September 11, 1925.

My present invention has for its object to provide an improved and simplified cinematographic machine founded on an optical system of substitution of the pictures or images resulting in a remarkably neat and fixed projection with a simple and uniform movement of film and mechanism.

My said cinematographic machine,—besides ordinary commercial use for cinema- theatres,—owing to its very great simplicity of structure and facility of operation is particularly adapted for use in domestic circles and schools, and owing to the possibility of movement in both directions and absence of wear of film, it may also be adapted for use with automatical advertising apparatus.

My invention is diagrammatically illustrated in two of its modifications in the annexed drawings where Fig. 1 is a vertical section and Figs. 2 and 3 show details of cylinder.

My invention substantially comprises a cylinder rotating on its axis and provided with teeth engaging the perforations of the film. The said cylinder carries a plurality of lenses or lenticular systems acting as objectives. The optical axes of said lenses are equidistant from each other and situated in a plane which is normal to the axis of rotation and may be placed on the longitudinal middle line of the film, as shown in Figs. 1 and 3,—or outside of same, as shown in Fig. 2.

The cylinder with lenses L and toothed crowns D is constructed with great care so that it may be well centered on its axis. The size of the teeth for carrying and guiding the film should be in accordance with the size and shape of the perforations on the film so as to permit only the minimum play. As shown in Figs. 1 and 3, the diameter of the crown of the lenses L is a little smaller so as to prevent the lenses from touching the film. The lenses are arranged equidistant from one another and from the center of rotation of the drum and have the same optical characteristics so that there is a perfect superposing of the successive images.

S is a prism or mirror, immovable in the interior of the cylinder, designed for directing according to its axis the picture from the objectives L (Fig. 1) to the screen.

The prism S is preferably supported by the immovable axle around which the drum rotates. This reflecting system may comprise a simple mirror or a prism as in the case of Figs. 1 and 3 and a double reflecting system with two mirrors or a double reflecting prism as shown in Fig. 2. The luminous rays after traversing the film are reflected and directed along the axle of the drum as shown in Fig. 1 and then reflected again traversing the lenses L as shown in Fig. 2.

The operation of my device is as follows:

The cylinder in rotating carries the film or is carried by the film by teeth crown D and the photograms or pictures F F' F'' are successively presented at A between the condenser Q and the objectives L L' L'' at a distance of A B corresponding to the focal distance of each objective. In this way each picture is shifted together with an objective for the same length of way and the said picture is reproduced on the screen with a displacement corresponding to the few millimeters of the aperture of a fixed diaphragm G. Absolute immobility of picture on the screen, whilst film and objectives are shifted, may be obtained by causing the objectives to move for a slightly less length of way than that of the film. To obtain this it will be sufficient that the distance between the optical centre of the objectives and the axis of rotation is slightly less than the radius of the toothed crown. The eventual improvements and the corrections of this value, even in case of variation of distance of projection, are obtained by a fixed lens (or lenticular system), which according to the correction to be made will be positive or negative and is placed between the screen and the objectives, a positive lens being equivalent to moving the objectives towards the axis, and a negative one to moving them away therefrom.

Fig. 2 shows the case in which the objectives are placed at the side of the film and represents a position of wall of cylinder in an apparatus for normal films. A system of fixed mirrors or prisms (not illustrated) may be used for so deflecting the light beams that they will reach the screen from the condenser after having passed through the condenser and the objectives independently from the particular location of the various parts as necessitated by the system.

It is obvious that the above described projection machine with suitable alterations may be also adapted for use with picture taking machines.

Having now particularly described and ascertained the nature of my said invention and in what manner the same is to be performed I declare that what I claim is:

1. A cinematographic machine comprising a rotating cylinder having a toothed crown for engaging the perforations of the film, a plurality of lenses disposed on the periphery of said cylinder, a light source, a condenser disposed between said light source and said cylinder, said lenses being arranged to occupy a position spaced from the film a distance corresponding to the focal length of the lenses, a fixed diaphragm disposed in front of said rotating cylinder between said cylinder and said condenser and adapted to limit the field of action of the lenses having substantially a rectilineous movement, said film being adapted to pass in front of said condenser, and a fixed prism arranged in the interior of the rotating cylinder for deflecting the light beams onto a screen from the condenser after having passed through said film and the said objectives.

2. A cinematographic machine comprising a rotating cylinder having a toothed crown for engaging the perforations of the film, a plurality of lenses disposed on the periphery of said cylinder having their optical axes equidistant from each other and situated in a plane normal to the axis of rotation of the cylinder, a light source, a condenser disposed between said light source and said cylinder, said lenses being arranged to occupy a position spaced from the film, a distance corresponding to the focal length of the lenses, a fixed diaphragm disposed in front of said rotating cylinder between said cylinder and said condenser and adapted to limit the field of action of the lenses having substantially a rectilineous movement, said film being adapted to pass in front of said condenser, and a fixed prism arranged in the interior of the rotating cylinder for deflecting the light beams onto a screen from the condenser after having passed through said film and the said objectives.

3. A projection machine comprising in combination, a rotating cylinder having a toothed crown for engaging the perforations of a film, a circular group of objective lenses carried by, concentric with and rotatable with the cylinder a light source, a condenser located between the light source and said cylinder, means for reflecting the light beam axially from said cylinder, a film moved by said cylinder between the lenses and condenser at a distance corresponding to the focal length of the lenses, said toothed crown being located at a greater radial distance from the axis of rotation of the cylinder than the circular group of lenses, and a fixed diaphragm on the side of the film opposite the condenser.

In testimony whereof I have hereunto signed my name.

AUGUSTO GENTILINI.